United States Patent [19]

Gumussoy

[11] Patent Number: 5,023,562
[45] Date of Patent: Jun. 11, 1991

[54] DIGITIZING CIRCUIT FOR DEMODULATED DIGITAL DATA SIGNALS

[75] Inventor: Murat Gumussoy, Reading, England

[73] Assignee: Orbitel Mobile Communications Limited, Bracknell, England

[21] Appl. No.: 541,640

[22] Filed: Jun. 21, 1990

[30] Foreign Application Priority Data

Jun. 23, 1989 [GB] United Kingdom ............... 8914466

[51] Int. Cl.[5] ............................................ H04L 27/14
[52] U.S. Cl. .................................. 329/303; 307/268; 328/164; 375/88; 375/99
[58] Field of Search ............... 329/303, 310, 318, 349; 307/268; 328/164; 375/51, 57, 58, 83, 88, 94, 99

[56] References Cited

U.S. PATENT DOCUMENTS 3,879,665  4/1975  Carlow et al. ................... 375/99 X

FOREIGN PATENT DOCUMENTS 58-83430  5/1983  Japan ................................. 307/268
63-128811  6/1988  Japan ................................. 307/268

Primary Examiner—Siegfried H. Grimm
Attorney, Agent, or Firm—Leydig, Voit & Mayer

[57] ABSTRACT

The apparatus is for digitizing demodulated frequency shift key modulated data signals, and comprises a differentiating circuit arranged to receive the demodulated data signal, and produce differentiated pulses at an output thereof. First and second comparators are arranged to receive the differentiated pulses, and compare the pulses with respective reference voltages to generate output pulses when pulses above and below the respective reference voltages are detected. The outputs of the comparators are connected to the set and reset inputs respectively of a flip-flop, causing a digitized form of the input demodulated signal to be generated at an output of the flip-flop.

7 Claims, 2 Drawing Sheets

DIGITIZING CIRCUIT FOR DEMODULATED DIGITAL DATA SIGNALS

BACKGROUND OF THE INVENTION

1. Field of the Invention

This invention relates to signal processing apparatus and methods. In particular the invention relates to apparatus for, and methods of digitizing digitally modulated data which has subsequently been demodulated, as are used in cordless telephone systems.

In a communication system where frequency shift keying (FSK) is used as the method of modulation for the transmitted digital data, the received modulated signals are first demodulated and then redigitized.

2. Description of the Prior Art

FIG. 1 is a schematic diagram of a known apparatus for digitising demodulated FSK modulated data.

Referring to FIG. 1, a comparator 1 is used to compare the instantaneous value of the incoming demodulated signal I with its mean level. The mean level is determined by filtering the signal I with a low pass filter comprising a resistor R and capacitor C, the filter having a long time constant compared to the bit period of the data, the time constant being determined by the values of the resistor R and capacitor C.

This simple process is, however, unsuitable for a system where the data is transmitted in bursts, such as in the second generation cordless telephone system, commonly known as CT2. For example in CT2, transmission and reception takes place in 1 ms bursts with the demodulated signal I having an arbitrary DC level during reception of the transmitted data. This will cause the mean DC level at the reference input of the comparator 1 to drift, making the detection of the data at the start of reception impossible. Similar problems will also arise when receiving data which is highly unbalanced; i.e. a long sequence of 1s or 0s. There exists another problem in applications where the transmitter and receiver centre frequencies are allowed to drift from their nominal values by specified amounts: this will also cause the mean level of the demodulated signals to drift.

Various solutions have been proposed to minimise the effect of the mean level of the demodulated signal drifting as a result of frequency offsets in the transmitted data, unbalanced data and the receiver being turned off during transmission. All of these solutions, however, have severe limitations, and fail to provide a complete solution to DC drift related problems.

SUMMARY OF THE INVENTION

It is an object of the present invention to provide apparatus and a method which overcome the above mentioned problems in an economical and efficient manner.

According to a first aspect of the present invention there is provided a signal processing apparatus for digitizing a demodulated digital data signal, the apparatus comprising differentiating means arranged to receive the demodulated data signal and produce differentiated pulses, first and second comparators each arranged to compare the differentiated pulses with a respective predetermined reference voltage so as to generate output pulses when differentiated pulses above and below the respective reference voltages are detected, the outputs of the first and second comparators being connected to the set and reset inputs respectively of a flip-flop, so as to cause a digitized form of the demodulated data signal to be generated at an output of the flip-flop.

An apparatus in accordance with the present invention has the advantage that the apparatus may be implemented by a relatively simple circuit which overcomes the above mentioned problems in an efficient manner, by generating a digitized output signal which is independent of DC drift in the demodulated data.

According to a second aspect of the present invention there is provided a signal processing method for digitizing a demodulated digital data signal, the method comprising the steps of: applying the demodulated data signal to differentiating means to provide pulses, applying the pulses to the first inputs of first and second comparators, applying first and second reference voltages to the second inputs of the first and second comparators respectively, and using the output signals generated by the first and second comparators to reset and set a flip-flop to produce at an output of the flip-flop, a digitized form of the demodulated data signal.

BRIEF DESCRIPTION OF THE DRAWINGS

One embodiment of the present invention will now be described, by way of example only, with reference to the accompanying drawings in which.

DESCRIPTION OF THE PREFERRED EMBODIMENT

Figure 1:
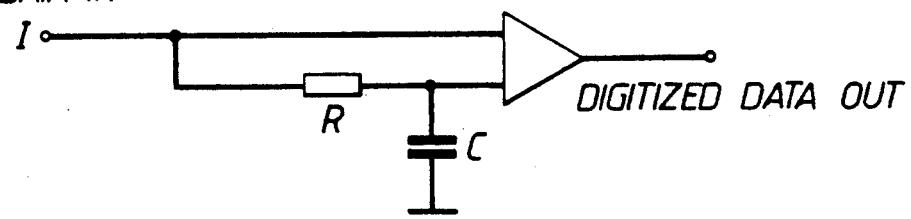
FIG. 1 shows the prior art apparatus for digitizing FSK demodulated data as already described.
Figure 2:
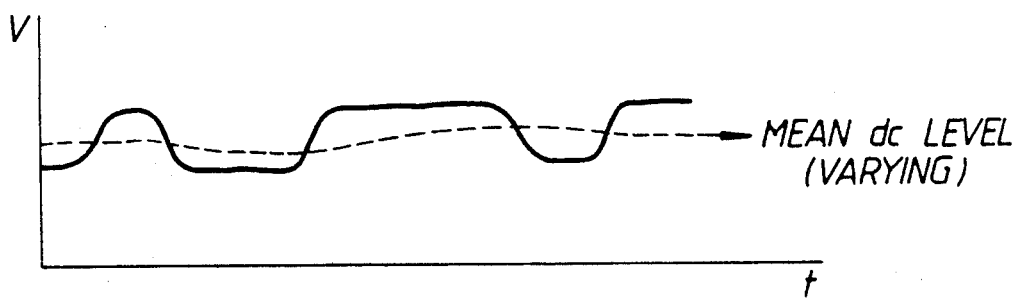
FIG. 2 shows a typical FSK demodulated output which is to be digitized.
Figure 3:
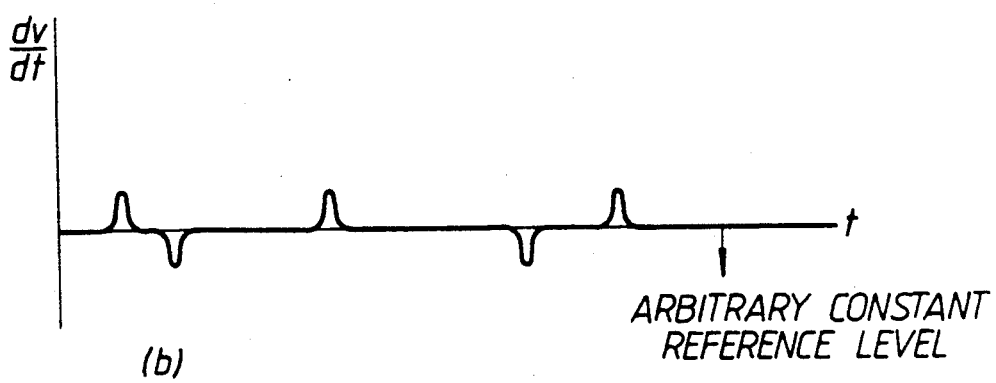
FIG. 3 shows the FSK demodulated output differentiated.

Referring firstly to FIG. 2, a typical FSK modulated data signal which has subsequently been demodulated is shown. The signal shown in FIG. 3 is obtained if the demodulated signal is differentiated by a differentiating circuit with a time constant reasonably faster than the rise and fall times of the input demodulated signal. The series of pulses shown in FIG. 3 can now be employed to recreate the demodulated data by using the pulses above the reference level to indicate the beginning of logic '1' and those below the reference level can be used to indicate the end of logic '1'. Since continuous 1s and 0s will be 'zeroed' by the action of the differentiating circuit they will not cause any shift in the reference level.

Figure 4:
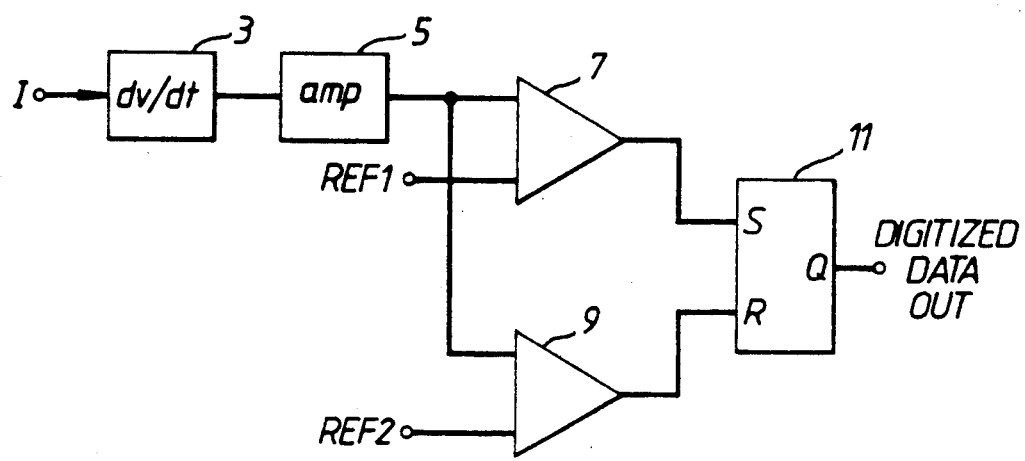
FIG. 4 is a schematic block diagram of the apparatus according to the embodiment of the present invention, for digitizing the FSK demodulated data.

Referring to FIG. 4, incoming demodulated data signals from the demodulator (not shown) are differentiated in a differentiating circuit 3 having a time constant of about 1 microsecond. This time constant compares with a data bit period of typically 14 microseconds with rise and fall times reaching up to 5-6 microseconds. Pulses are thus produced of the form shown in FIG. 3.

An amplifier circuit 5 is used to amplify the pulses output of the differentiating circuit 3, the amplified pulses then being compared with the respective fixed reference voltages, REF1,REF2, in two comparators, 7, 9. These comparators 7,9 are arranged such that the pulses produced by the differentiating circuit 3 which lie above and below the reference levels will generate positive edges which set and reset the S-R flip-flop 11.

Therefore, the flip-flop output at Q will be a clean digitized form of the input demodulated signal. Since the reference levels are constant and the incoming signal is first differentiated, any dc offset problems caused by either unbalanced data, frequency shifts, or the receiver being operated in bursts, will not effect the digitizing process.

Figure 5:
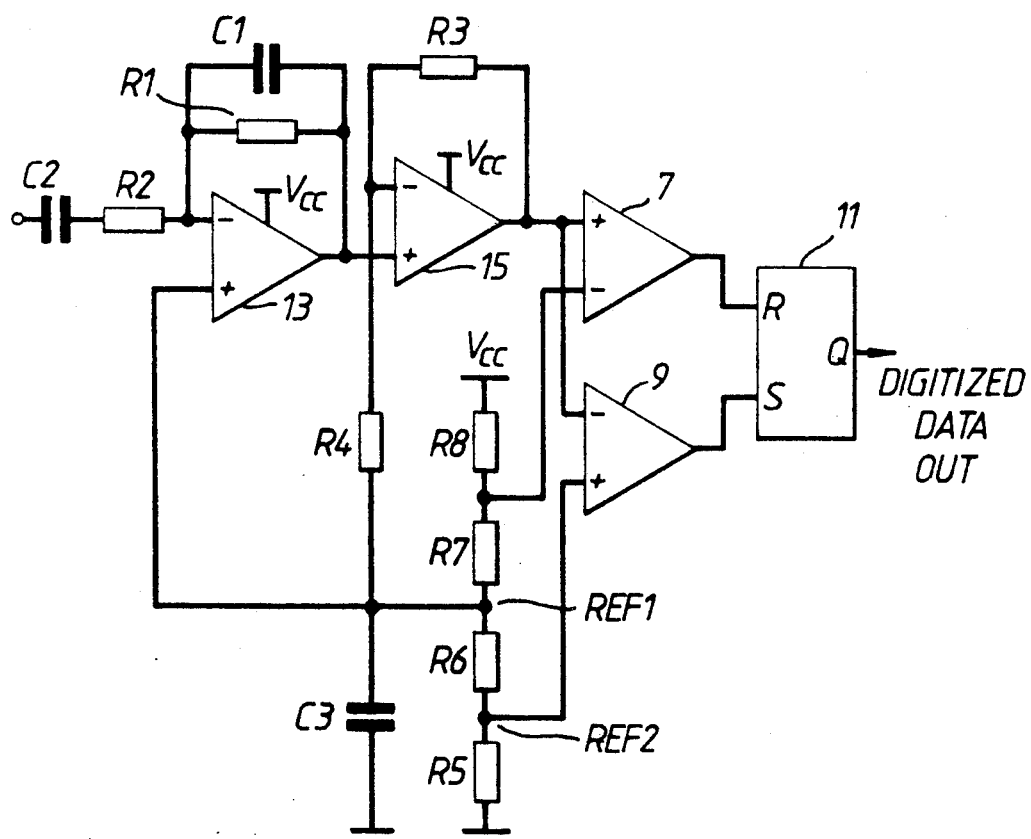
FIG. 5 shows a more detailed diagram of the apparatus of FIG. 4.

Referring now also to FIG. 5, the differentiating circuit 3, comprises an operational amplifier 13, in parallel with a feed-back circuit comprising a resistor R1 and capacitor C1. The demodulated data I is input into the amplifier 13 via an input line comprising a series arrangement of a capacitor C2 and resistor R2. The non-inverting input of the amplifier 13 is set at half way between ground and the supply voltage Vcc so that a constant reference level of typically 2.5 v is established at the input.

The amplifier circuit 5 comprises an amplifier 15 with a feed-back resistor R3, connected to its negative input. The negative input of the amplifier 15 is also connected via resistor R4 to a node connected to the mid-point of a potential divider chain comprising four resistors R5-R8 connected in series between ground and Vcc. The node is also connected via capacitor, C3 to ground.

The reference levels REF1, REF2 for the comparators 7,9 are provided by tapping off from the potential divider chain R5-R8. The reference for the differentiator circuit 1 is taken from the mid-point of the chain, between resistors R6 and R7. The reference REF1 is taken off between resistors R7 and R8, and the reference REF2 is taken off between resistors R5 and R6. It will be appreciated that the use of the fixed reference levels REF1,REF2 ensures that no set up adjustments are necessary before the reception of data.

In the CT2 type of cordless telephone system a carrier frequency is transmitted during ramp-up of the transmitted signal. An apparatus in accordance with the present invention can be used in such circumstances. However, if one of the deviation frequencies corresponding to a 1 or 0 is transmitted during ramp-up and the first bit of the burst to be transmitted corresponds to the same frequency, there will not be a level transition at the output of the comparator and the first bit may be detected wrongly. One way to overcome this problem is to set a common standard where the transmitted frequency during ramp-up is specified to be either the carrier frequency or one that corresponds to a 1 or 0. All that is necessary to overcome this problem is to preset the flip-flop 11 to the state corresponding to the frequency chosen to be transmitted during ramp-up. In this way, if there is a frequency transition for the first bit, then it will be detected. If there is no frequency transition, then the flip-flop will be in the right state and the first bit detected will be correct.

It will be apprecicated that whilst the present invention is particularly applicable to signal processing apparatus and methods for digitizing a demodulated data signal which has been modulated by frequency shift keying, the invention is also applicable to a data signal which has been encoded by other modulation techniques, for example amplitude modulation.

What I claim is:

1. Signal processing apparatus for digitizing a demodulated digital data signal, the apparatus comprising differentiating means arranged to receive the demodulated data signal and produce differentiated pulses, first and second comparators each arranged to compare the differentiated pulses with a respective predetermined reference voltage so as to generate output pulses when differentiated pulses above and below the respective reference voltages are detected, and a flip-flop having set and reset inputs, and an output, the outputs of the first and second comparators being connected to the set and reset inputs respectively of the flip-flop, so as to cause a digitized form of the demodulated data signal to be generated at the output of the flip-flop.

2. Signal processing apparatus as claimed in claim 1 in which the demodulated digital data was frequency shift key modulated.

3. Signal processing apparatus as claimed in claim 1, wherein an amplifier is connected between the output of the differentiating means and the input to the comparators.

4. Signal processing apparatus as claimed in claim 3, wherein the amplifier is connected to a positive input of the first comparator and to a negative input of the second comparator.

5. Signal processing apparatus as claimed in claim 4, wherein a first reference voltage is applied to a negative input of the first comparator, and a second reference voltage is applied to the positive input of the second comparator, said first reference voltage being greater than said second reference voltage.

6. Signal processing apparatus as claimed in claim 5, wherein a non-inverting input of the differentiating means is connected to a reference voltage which lies substantially between the values of the first and second reference voltages.

7. A signal processing method for digitizing a demodulated digital data signal, comprising the steps of: applying the demodulated data signal to differentiating means to provide pulses, applying the pulses to the first inputs of first and second comparators, applying first and second reference voltages to the second inputs of the first and second comparators respectively, and using the output signals generated by the first and second comparators to set and reset a flip-flop to produce at an output of the flip-flop, a digitized form of the demodulated data signal.

* * * * *